United States Patent [19]

Sander, Jr.

[11] Patent Number: 4,658,308

[45] Date of Patent: Apr. 14, 1987

[54] METHOD AND APPARATUS FOR RETRACTING HEAD AND BRAKING MOTOR OF A DISC DRIVE DEVICE

[75] Inventor: Charles M. Sander, Jr., Boulder, Colo.

[73] Assignee: MiniScribe Corporation, Longmont, Colo.

[21] Appl. No.: 836,345

[22] Filed: Mar. 5, 1986

[51] Int. Cl.⁴ .......................... G11B 5/012; G11B 5/54
[52] U.S. Cl. ....................................... 360/74.1; 360/75
[58] Field of Search ................................. 360/74.1, 75

[56] References Cited

U.S. PATENT DOCUMENTS

| | | | |
|---|---|---|---|
| 3,626,264 | 12/1971 | Halfhill et al. | 318/331 |
| 3,629,679 | 12/1971 | Halfhill | 318/563 |
| 3,956,766 | 5/1976 | Hanson et al. | 360/78 |
| 4,237,501 | 12/1980 | Barmache et al. | 360/75 |
| 4,371,903 | 2/1983 | Lewis | 360/75 |

Primary Examiner—George G. Stellar
Attorney, Agent, or Firm—Curtis, Morris & Safford

[57] ABSTRACT

The head assembly of a disc drive device is retracted upon the interruption of power to that device by utilizing the emf that is generated by the disc drive spindle motor as a result of the rotation of that motor following power interruption. Then, after a delay sufficient to allow the head assembly time to retract, the spindle motor is dynamically braked. Dynamic braking is achieved by utilizing a voltage to which a capacitor has been charged during normal operation to energize switching elements which effectively short circuit the motor windings.

16 Claims, 2 Drawing Figures

METHOD AND APPARATUS FOR RETRACTING HEAD AND BRAKING MOTOR OF A DISC DRIVE DEVICE

BACKGROUND OF THE INVENTION

This invention relates to a method and apparatus for retracting the head assembly of a disc drive device and for braking the spindle motor therein once power to the device is interrupted and, more particularly, to utilize the emf that is generated by the spindle motor following power interruption to retract the head assembly and then, after a suitable delay, the motor is dynamically braked.

Disc drive devices have become readily accepted as computer peripheral devices for long term storage of large quantities of data. Such devices typically are constructed as rigid disc drives, also known as Winchester disc drives, and "floppy" disc drives. Rigid, or hard disc drive devices, offer storage capacities that are several orders of magnitude greater than floppy disc drive devices. However, whereas hard disc drives typically contain one, two or more discs that are permanently installed, floppy disc drive devices allow the user to load and unload a floppy disc, thus enabling the user to store different types of information on different discs, as needed. The relative advantages and disadvantages of hard discs and floppy discs are known; and suffice it to say that both types of discs and disc drives have particular uses which, depending upon the application of the user, might favor the use of one over the other.

In hard disc drive devices, the head, or heads (typically, plural surfaces of plural discs are used for the writing and reading of data), "fly" over the surface of the disc. The rotation of the disc creates an air bearing on which the head (or heads) is carried. If this air bearing is reduced, as when the rotating disc slows, the head may crash to the surface of that disc, thus resulting in damage to the disc and to the head and, moreover, resulting in significant loss of recorded information due to the crash. To avoid significant changes in the rotary speed of the disc, the disc drive spindle motor (which rotatably drives the disc) is controlled to detect and account for speed variations. One type of spindle motor control arrangement is described in copending application Ser. No. 706,147, assigned to the assignee of the present invention.

Notwithstanding desired spindle motor speed controls, precautions must be taken to avoid head-disc interference resulting in the destruction of recorded data when the disc drive is deenergized, that is, when power is turned off (i. e. when the usual POWER switch is opened). Therefore, upon opening the POWER switch, circuitry might be triggered, as under microprocessor control, to retract the head (or heads) before power actually is interrupted. That is, the usual head positioning apparatus, such as a stepper motor or a linear head drive motor (both of which are referred to generically as the head actuator) is controlled to move the heads to a "home" position that is safely away from the usable surface of the disc. Once in this home position, there is no danger of destroying useful data when the heads land on the surface of the disc after the termination of rotation following power interruption.

While the aforementioned head retraction arrangement is satisfactory when power deliberately is interrupted, as when the POWER switch is opened, that arrangement might not be called into play in the event of an inadvertent power interruption, such as a power failure. Likewise, this head retraction arrangement might not be initiated during other emergency conditions that result in power interruption. To account for such emergency conditions and power interruptions, it has been proposed heretofore to sense all power interruptions and then retract the heads automatically in response thereto. One such proposal relies upon an inherent time delay between sensed power interruption and significant reduction in disc rotation to generate and supply a "retraction" control signal to the head actuator. However, this proposal runs the danger of a rapid reduction in disc rotation below the critical speed before the head is fully retracted, thus resulting in undesired head-disc interference, or even head crash.

Another head retraction proposal relies upon a large storage capacitor which is charged during normal operation of the disc drive device and, upon sensing power interruption, is discharged through the head actuator. However, such large capacitors occupy a significant amount of physical space within the disc drive device and, in an effort to achieve miniaturization in these devices, such space simply is not available.

Yet another proposal utilizes a relay which, during normal operation of the disc drive device, connects the actuator to the usual head position control circuit. However, upon sensing an emergency condition, the relay is operated to change over the connection of the actuator to the windings of the spindle motor. As this motor continues to rotate following power interruption, an emf is generated in these windings; and this emf is supplied to the actuator in a direction to retract the head. Thus, the "coasting" spindle motor is used to generate an emf which, in turn, powers the actuator for head retraction.

In addition to head retraction upon sensing power interruption, it is desirable to brake the spindle motor, thus preventing coasting of that motor over a significant time period and to impart a "soft", non-destructive landing to the heads. Mechanical braking apparatus requires a substantial amount of space within the disc drive itself and, thus, is not a viable technique for use in miniaturized devices. Although dynamic braking of the spindle motor offers an advantageous alternative, this presents the real danger of head-disc interference when the rotary speed of the disc falls below the critical level needed to support the head. That is, as the spindle motor is dynamically braked, the emf generated thereby falls rapidly before the head actuator is sufficiently driven to retract the head; and the combination of reduced rotary speed and incomplete head retraction will result in the landing of the head onto the usable surface of the disc.

OBJECTS OF THE INVENTION

Therefore, it is an object of the present invention to provide an improved method and apparatus for retracting the head assembly of a disc drive device which avoids the aforenoted disadvantages attendant previous proposals.

Another object of this invention is to provide an improved method and apparatus for retracting the head assembly and braking the spindle motor in a disc drive device without running the risk of head crash or head-disc interference on the usable surface of the disc included in that device.

A further object of this invention is to utilize the emf generated by a coasting spindle motor in a disc drive device to retract the head assembly therein upon interruption of power to the device, and to dynamically brake that motor.

An additional object of this invention is to provide an improved technique for automatically retracting the head assembly of a disc drive device upon interruption of power thereto, by utilizing the emf generated as a result of the coasting of the disc drive spindle motor, and then, after a delay sufficient to allow complete retraction of the head assembly, to dynamically brake the spindle motor.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for retracting the head assembly of a disc drive device and for braking the spindle motor therein upon interruption of power to the device. The emf that is generated as a result of the rotation of the spindle motor following power interruption is used to drive the head assembly in a retraction direction. Then, following a delay sufficient to allow the head assembly time to retract, the spindle motor is dynamically braked.

In accordance with one aspect of this invention, the aforementioned delay in dynamically braking the spindle motor is produced by a capacitor which is charged during normal operation of the disc drive device and then is discharged following power interruption. After this capacitor has been discharged, the spindle motor is dynamically braked.

Preferably, switching elements are used to energize the spindle motor windings during normal operation. Following power interruption, the aforementioned capacitor provides a suitable voltage to the drive circuit that normally actuates the switching elements, thus inhibiting the operation of these switching elements until the capacitor has discharged. At that time, the voltage across another capacitor, which had been charged during normal disc drive operation, is applied to the switching elements resulting in the short circuiting of the motor windings to dynamically brake the motor. Although capacitors are used to control the switching elements, such capacitors are of relatively small size and do not function to drive the head actuator. Rather, as aforementioned, the actuator is driven by the emf generated by the coasting spindle motor prior to the dynamic braking thereof.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
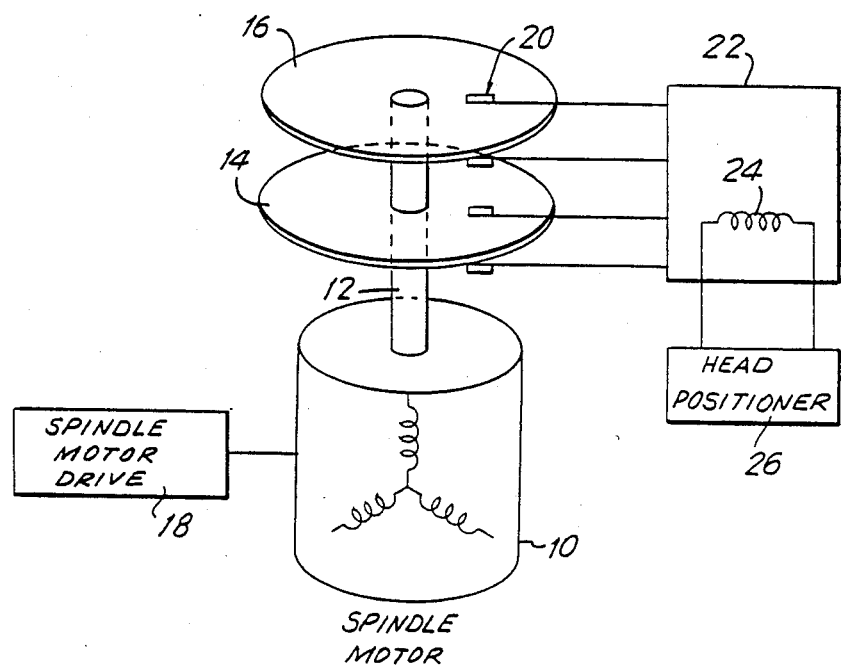
FIG. 1 is a block diagram of the basic elements comprising a disc drive device.

Referring now to the drawings, FIG. 1 is a block diagram of the basic elements comprising a disc drive system, the illustrated embodiment preferably comprising a "hard" disc drive. It will be appreciated, however, that the following description is applicable to a "floppy" disc drive in which the present invention may be utilized to retract the head (or heads) and dynamically brake the spindle drive motor of that floppy disc drive.

The disc drive device shown in FIG. 1 is comprised of a spindle motor 10, a plurality of hard discs 14 and 16, a spindle motor drive circuit 18, a plurality of heads 20, a head assembly 22 and a head positioning circuit 26. Spindle motor 10 preferably comprises a DC motor having a plurality of stator windings which are individually energized under the control of motor drive circuit 18, these motor windings thus producing a force for rotatably driving a rotor. Preferably, the rotor comprises a DC magnet. This rotor is mechanically coupled to a drive shaft 12 to which discs 14 and 16 are secured. Discs 14 and 16 are of conventional construction, known to those of ordinary skill in the art, and are housed in a sealed container, as is typical for Winchester disc drives.

Motor drive circuit 18 may include or be controlled by a microprocessor for energizing the motor windings in a predetermined sequence. The motor drive circuit functions to drive the motor at a predetermined, constant speed and, preferably, initiates a start-up operation whereby the discs rapidly and accurately attain their desired operating speed. It is appreciated that this speed is sufficient that the air flow generated by the rotation of discs 14 and 16 causes heads 20 to "fly" above the surface of the discs at a height on the order of 50 microinches or less. One example of motor drive circuit 18 is described in copending application Ser. No. 706,147.

Heads 20 are mechanically coupled to and supported by head assembly 22, this head assembly being movable to position the heads at a desired track on discs 14 and 16. In the illustrated embodiment, two discs are provided, each disc having, of course, two surfaces on which information may be written and read. Accordingly, heads 20 are comprised of four separate heads, each head being associated with a respective disc surface for the purpose of writing and/or reading information on that surface. If desired, a separate surface of one of discs 14 and 16 may be dedicated as a servo surface having servo information recorded thereon. The particular one of heads 20 which cooperates with that surface then may function as a servo head which aids in the control over head assembly 22 to position the heads at a desired track. Head assembly 22 may include a stepper motor for driving the heads radially along discs 14 and 16, such as the stepper motor described in U.S. Pat. No. 4,428,012. Alternatively, head assembly 22 may include a linear motor formed of a coil wound about a magnetic core, the coil being selectively energized to generate a magnetomotive force, whereby the coil is driven longitudinally with respect to that core. As yet another embodiment, head assembly 22 may include an arm that is pivotably driven, with heads 20 being mechanically secured to that arm so as to be movable along respective radii of discs 14 and 16 as the arm pivots. In the preferred embodiment shown in FIG. 1, head assembly 22 includes a motor coil 24, referred to hereinafter as an actuator coil, coupled to head positioning circuit 26 for the selective energization of coil 24. As the coil is energized, head assembly 22 is driven to move heads 20 radially inwardly or outwardly of discs 14 and 16. The manner in which head positioning circuit 26 operates forms no part of the present invention per se. Suffice it to say that current flows through actuator coil 24 under the control of the head positioning circuit so as to position heads 20 at desired tracks.

During normal operation, motor drive circuit 18 drives spindle motor 10 to rotate discs 14 and 16 at the aforementioned constant predetermined speed. Heads 20 function to write data on and read data from the respective surfaces of these discs. Depending upon the location at which data is written or read, head positioning circuit 26 drives actuator coil 24 of head assembly 22 to move heads 20 radially such that the heads are positioned at a particular track at which information is to be written or read on a respective disc surface. When a POWER switch (not shown) is opened, head positioning circuit 26 may be controlled by a suitable circuit, or under microprocessor control, to drive actuator coil 24 such that head assembly 22 is driven to retract heads 20 from the usable surfaces of discs 14 and 16. For example, head assembly 22 may drive heads 20 in the radially outward direction to an outer track (or beyond) of the discs. Then, motor drive circuit 18 interrupts power to spindle motor 10 such that the spindle motor speed is retarded and, ultimately, the spindle motor is arrested. As the rotary speed of discs 14 and 16 decreases, the air bearing generated thereby falls below the critical value needed to support heads 20. However, since the heads had been retracted previously, there is no danger of the heads landing on the usable surfaces of the discs.

The aforementioned has described an orderly "power down" process which is initiated when the aforementioned POWER switch is opened. However, if power suddenly or inadvertently is interrupted from motor drive circuit 18 and head positioning circuit 26, for example, if the usual power supply (not shown) which is used to power (or energize) these circuits is interrupted, power is removed from spindle motor 10, thus resulting in an immediate speed reduction in the rotation of discs 14 and 16, whereupon heads 20 may crash to the usable surfaces of these discs. It will be appreciated that the removal of power from head positioning circuit 26 would prevent actuator coil 24 from being energized and, thus, would prevent head assembly 22 from retracting heads 20 before the heads landed on the usable surfaces of the discs.

The purpose of the present invention is to prevent heads 20 from crashing to the surfaces of discs 14 and 16 in the event that power is interrupted from the usual disc drive power supply and, moreover, to prevent head-disc interference. This invention is applicable to the embodiment illustrated in FIG. 1 and to other alternative embodiments, such as embodiments wherein only a single disc is provided, or three or more discs are provided. The invention also is applicable to a disc drive device which employs a single head assembly 22 or one in which two or more head assemblies are used. Also, the present invention may be used in floppy disc drive devices for the purpose of retracting the head (or heads) therein and braking the spindle drive motor upon an interruption in the disc drive power supply.

Figure 2:
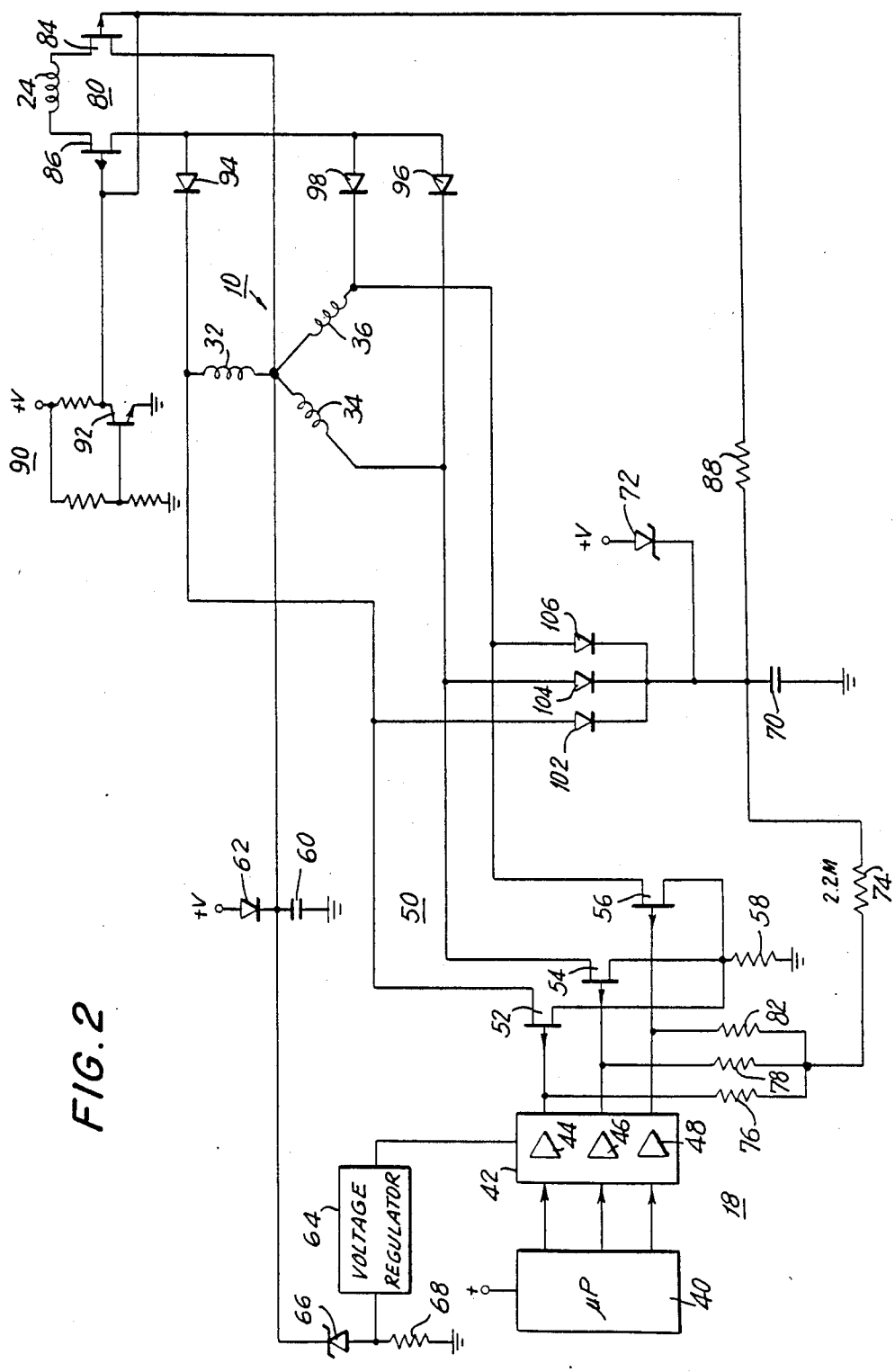
FIG. 2 is a partial schematic, partial block diagram of a preferred embodiment of the present invention.

One embodiment of the present invention is illustrated in partial block, partial schematic form in FIG. 2. The same reference numerals are used in FIG. 2 as were used in FIG. 1 to identify like component parts. Spindle motor 10 includes motor windings 32, 34 and 36, these motor windings being selectively energized by motor drive circuit 18 which is comprised of a microprocessor 40, drive amplifiers 42 and a switching circuit 50. A voltage regulator 64 is adapted to supply a regulated energizing voltage to drive amplifiers 42 in response to DC power supplied thereto from a power supply (not shown). The microprocessor may be energized directly from that power supply. A capacitor 60 normally is charged by the power supply, and another capacitor 70 is adapted to be charged by that power supply. FIG. 2 also illustrates actuator coil 24, a switching circuit 80 coupled to the actuating coil and a disable circuit 90 coupled to switching circuit 80.

In greater detail, microprocessor 40 is coupled to drive amplifiers 42, the drive amplifiers comprising low impedance output amplifiers 44, 46 and 48, respectively. Switching circuit 50 is comprised of individual switching elements 52, 54 and 56, illustrated herein as FET's. If desired, other conventional semiconductor switching devices, such as bipolar transistors, SCR's, and the like may be used as switching elements 52, 54 and 56. In the illustrated embodiment, the gate electrodes of switching elements 52, 54 and 56 are coupled to the respective low impedance outputs of amplifiers 44, 46 and 48. Preferably, the drain electrode of each FET switching element is connected to a respective one of the motor windings. Thus, the drain electrode of FET switching element 52 is connected to one end of motor winding 32, the drain electrode of FET switching element 54 is connected to one end of motor winding 34 and the drain electrode of FET switching element 56 is connected to one end of motor winding 36. It is seen that the other ends of these motor windings are connected in common; and the source electrodes of FET switching elements 52, 54 and 56 likewise are connected in common and thence through a low impedance current sense resistor 58 to a reference potential, such as ground.

It is appreciated that, when a trigger signal is supplied from a respective one of the amplifiers included in drive amplifiers 42 to the gate electrode connected thereto, the respective FET switching element is rendered conductive to supply a low impedance path to ground. The common connection of motor windings 32, 34 and 36 is coupled via a diode 62 to the power supply (not shown), thus permitting current to flow from a suitable source of operating potential +V, generated by that power supply, through the motor winding and then through the FET switching element which is rendered conductive to ground. Microprocessor 40 controls low impedance output amplifiers 44, 46 and 48 to supply trigger signals to FET switching elements 52, 54 and 56 in proper, predetermined sequence so as to energize motor windings 32, 34 and 36 in that sequence, resulting in the generation of a rotary force to rotate the rotor of spindle motor 10. Thus, the selective energization of the motor windings during normal operation of the spindle motor causes that motor to rotate and, as a result, heads 20 fly above the surfaces of discs 14 and 16.

Drive amplifiers 42 are connected to voltage regulator 64 which functions as a voltage supply to furnish operating potential to the drive amplifiers. Voltage regulator 64 may be of conventional construction and is, in turn, powered from the source of operating potential +V. As shown, a series circuit formed of diode 66 and resistor 68 is connected, via diode 62, to the source of operating potential +V, and a substantially constant voltage produced across resistor 68 is supplied to voltage regulator 64. For so long as a sufficient voltage is supplied from the voltage regulator to drive amplifiers 42, relatively low level signals are provided at the low impedance outputs of each of amplifiers 44, 46 and 48 except when a trigger signal is supplied from microprocessor 40 to a particular one of these amplifiers. It will be appreciated, therefore, that in the absence of such a trigger signal, FET switching elements 52, 54 and 56 are inhibited, or rendered non-conductive, by the low level signals produced at the low impedance outputs of amplifiers 44, 46 and 48, respectively. Such low level signals may be thought as inhibit signals.

From FIG. 2 it is seen that capacitor 60 is connected in parallel with the series circuit formed of zener diode 66 and resistor 68. This capacitor is adapted to be charged from the source of operating potential +V during normal operation of the disc drive device. That is, the capacitor is charged during normal operation of the usual power supply (not shown). Capacitor 60 may be on the order of 220 μF and, when power is interrupted, that is, when operating potential +V produced by the power supply terminates, capacitor 60 is adapted to discharge through zener diode 66 and resistor 68. The RC discharge time constant for capacitor 60 is determined by the resistance value of resistor 68, the impedance presented by zener diode 66, and the impedance presented by voltage regulator 64. In one embodiment, this RC discharge time constant is in excess of 25 milliseconds.

Capacitor 70 is adapted to be charged during normal operation of the disc drive device. To this effect, the capacitor is connected to the power supply (not shown) via a zener diode 72 and is charged in response to the operating potential +V produced by that power supply. Capacitor 70 also is coupled by way of a high impedance resistor 74 (for example, a resistor having a resistance on the order of 2.2 megohms) and then through individual lower impedance resistors 76, 78 and 82 to the gate electrodes of FET switching elements 52, 54 and 56, respectively. High impedance resistor 74, together with lower impedance resistors 76, 78 and 82, provide sufficient isolation between the low impedance outputs of amplifiers 44, 46 and 48 and capacitor 70. Hence, there is substantially no interaction or influence on the voltage stored across capacitor 70 by the low level signals produced at the low impedance outputs of amplifiers 44, 46 and 48. Likewise, the voltage stored across capacitor 70 is inhibited from being supplied to the gate electrodes of the FET switching elements for so long as low level inhibit signals are produced at the outputs of these amplifiers. The relatively high impedance resistor 74 prevents capacitor 70 from being discharged in response to the low level signals that are provided at the low impedance outputs of amplifiers 44, 46 and 48.

Capacitor 70 also is coupled by another high impedance resistor 88 to switching circuit 80. This switching circuit is adapted, when operated, to connect actuator coil 24 to motor windings 32, 34 and 36 such that the actuator coil may be energized by an emf generated by these motor windings during coasting of spindle motor 10, as will be described. Switching circuit 80 preferably is comprised of FET switching elements 84 and 86, the gate electrodes of these FET switching elements being coupled to capacitor 70 by resistor 88. It will be appreciated that, if desired, other semiconductor switching elements may be used, such as bipolar transistors, SCR's, and the like. Preferably, the source electrode of FET switching element 84 is connected to the common connection of motor windings 32, 34 and 36, and the drain electrode thereof is connected to one end of actuator coil 24. The other end of this actuator coil is connected to the source electrode of FET switching element 86, and the drain electrode of this switching element is connected by diodes 94, 96 and 98 to motor windings 32, 34 and 36, respectively, as illustrated. It will be recognized that, when FET switching elements 84 and 86 are rendered conductive, current is permitted to flow (as will be described) from the common connection of the motor windings through switching element 84, through actuator coil 24, through switching element 86 and then through diode 94 to motor winding 32, through diode 96 to motor winding 34 and through diode 98 to motor winding 36. The purpose of diodes 94, 96 and 98 is to rectify current produced by the emf that is generated when spindle motor 10 coasts following a power interruption. Typically, an AC emf is generated by the coasting of the spindle motor; and the alternating current is rectified to a direct current to energize actuator coil 24 so as to retract heads 20.

It is desired, during normal operation of the disc drive device, to disable switching circuit 80 and, thus, prevent that switching circuit from responding to the voltage to which capacitor 70 is charged. When switching circuit 80 is disposed in its non-operating condition, actuator coil 24 is connected by other suitable means (not shown) to head positioning circuit 26 (FIG. 1). Accordingly, a disable circuit 90 is connected to switching circuit 80. This disable circuit is comprised of a suitably biased transistor 92, such as a bipolar transistor, that is rendered conductive during normal operation of the power supply (not shown). The collector-emitter circuit of transistor 92 is connected in series with ground and, when this transistor is conductive, a relatively low level signal (approximating ground potential) is provided at the collector electrode thereof. It is seen that the collector electrode of transistor 92 is connected in common to the gate electrodes of FET switching elements 84 and 86. Although the low level signal produced at the collector electrode of transistor 92 is sufficient to disable the operation of switching circuit 80, it is recognized that the high impedance of resistor 88 minimizes the discharge of capacitor 70 therethrough during normal operation of the disc drive device. However, in the event of a power interruption, operating potential +V terminates and the voltage at the collector electrode of transistor 92, which heretofore had been maintained at a relatively low level due to the conduction of the transistor, now is free to "float". Switching circuit 80 thus no longer is prevented from responding to the voltage to which capacitor 70 had been charged.

Diodes 102, 104 and 106 are connected between the free ends of motor windings 32, 34 and 36, respectively (i.e. the non-common connected ends), and capacitor 70. These diodes are conventional and function to prevent the capacitor from discharging through the motor windings or through the FET switching elements comprising switching circuit 50.

The manner in which the circuit illustrated in FIG. 2 operates now will be described. Initially, let it be assumed that spindle motor 10 is operating at its normal speed and actuator coil 24 is connected by suitable means (not shown) to head positioning circuit 26. It is appreciated that actuator coil 24 is selectively energized to move head assembly 22 such that heads 20 are positioned over desired tracks of discs 14 and 16. Also, during normal operation, the power supply (not shown) operates to generate operating potential +V; and voltage regulator 64 responds to this operating potential to supply regulated power to drive amplifiers 42. Operating potential +V charges capacitor 60 and also capacitor 70.

Microprocessor 40 and drive amplifiers 42, being suitably energized, trigger FET switching elements 52, 54 and 56 in predetermined sequence to energize motor windings 32, 34 and 36. As a result, spindle motor 10 is driven to rotate discs 14 and 16 at their desired operating speed. As mentioned above, the gate electrode of each FET switching element normally is supplied with a relatively low level voltage signal except for the trigger signal that renders the switching element conductive to energize the respective motor winding connected thereto. These signals, which appear at the low impedance outputs of amplifiers 44, 46 and 48, prevent the voltage stored across capacitor 70 from actuating the switching elements.

Also, during normal operation of the disc drive device, disable circuit 90 is supplied with operating potential +V, resulting in the conduction of transistor 92. Consequently, a relatively low level voltage is produced at the collector electrode of this transistor to disable the operation of switching circuit 80. The gate electrodes of FET switching elements 84 and 86 thus are maintained at or close to ground potential and are prevented from responding to the voltage to which capacitor 70 is charged. The relatively high impedances presented by resistors 74 and 88 minimize the discharge of this capacitor.

Now, let it be assumed that power to the disc drive device has been interrupted. This results in an interruption in the operation of the power supply, thereby terminating the operating potential +V. In response to this power interruption, microprocessor 40 no longer supplies trigger signals to drive amplifiers 42. However, the voltage to which capacitor 60 had been charged is applied to voltage regulator 64 to power drive amplifiers 42, whereupon the aforementioned inhibit signals are supplied to the gate electrodes of FET switching elements 52, 54 and 56 by low impedance output amplifiers 44, 46 and 48, respectively. These low voltage level inhibit signals prevent the voltage to which capacitor 70 had been charged (this voltage being referred to as a switching voltage) from being applied to the FET switching elements. Therefore, it is seen that none of motor windings 32, 34 and 36 is energized and, consequently, the inertia of spindle motor 10 maintains the rotation thereof. Nevertheless, because of inherent friction and other factors, this rotation decreases over a period of time. However, the coasting of the spindle motor is sufficient to generate an emf across each respective winding.

The loss of operating potential +V due to the power interruption in the power supply (not shown) renders transistor 92 of disable circuit 90 non-conductive. Accordingly, disable circuit 90 no longer prevents switching circuit 80 from responding to the switching voltage to which capacitor 70 had been charged. This switching voltage is applied by high impedance resistor 88 to the gate electrodes of FET switching elements 84 and 86, thereby rendering these switching elements conductive and connecting actuator coil 24 therethrough to motor windings 32, 34 and 36. Parallel current conducting paths thus are established from the common connection of the motor windings through FET switching element 84, through actuator coil 24, through FET switching element 86 and then through diode 94 to winding 32, through diode 96 to winding 34 and through diode 98 to winding 36. The emf generated across each winding as spindle motor 10 continues to coast thus drives current unidirectionally through the actuator coil. The actuator coil is energized by this current flow therethrough to move head assembly 22 in a direction whereby heads 20 are retracted.

While actuator coil 24 is energized by the emf generated by the rotation of spindle motor 10, capacitor 60 discharges through zener diode 66 and resistor 68 (as well as through various components included in voltage regulator 64) at a rate substantially determined by the RC discharge time constant formed of capacitor 60 and resistor 68. For as long as the voltage across this capacitor remains above the threshold level determined by zener diode 66 and resistor 68, voltage regulator 64 supplies operating voltage to drive amplifiers 42, resulting in the aforementioned lower voltage level inhibit signals supplied to the gate electrodes of each of FET switching elements 52, 54 and 56. The RC discharge time constant of capacitor 60 is selected to be greater than the maximum time needed to retract heads 20 from, for example, the innermost tracks on discs 14 and 16 to their "home" position.

While spindle motor 10 continues to coast, capacitor 60 discharges through zener diode 66 and resistor 68. Eventually, the voltage across capacitor 60 falls below the threshold level required by voltage regulator 64 to supply operating voltage to drive amplifiers 42. At that time, the lower voltage level inhibit signals that had been supplied by amplifiers 44, 46 and 48 to the gate electrodes of FET switching elements 52, 54 and 56 terminate. In the absence of such inhibit signals, the switching voltage across capacitor 70 now may be supplied via resistor 74 and resistors 76, 78 and 82 to the respective gate electrodes of these switching elements. In response to this switching voltage, each of the FET switching elements is rendered conductive, thus connecting each motor winding 32, 34 and 36 to ground via low impedance resistor 58. That is, these motor windings now are short-circuited to ground and, as a consequence thereof, spindle motor 10 is dynamically braked.

Thus, it is seen that, during normal operation of the disc drive device, each of windings 32, 34 and 36 is selectively switched by a respective one of FET switching elements 52, 54 and 56 to connect the winding to the source of operating potential +V, whereby current flows through the switched winding. However, following a power interruption, the motor windings are not connected to a source of power and, thus, spindle motor 10 merely coasts. This coasting generates an emf across each winding 32, 34 and 36, and this emf, in turn, supplies a current through actuator coil 24 which is connected to the motor windings by way of switching circuit 80. While spindle motor 10 coasts, capacitor 60 discharges. When the voltage across this capacitor falls below a threshold level, the operating voltage supplied by voltage regulator 64 to drive amplifiers 42, which previously had been sufficient to enable the drive amplifiers to apply inhibit signals to FET switching elements 52, 54 and 56, terminates. As a result, the inhibit signals likewise terminate, thus permitting the switching voltage across capacitor 70 to be supplied to the FET switching elements. These switching elements are rendered conductive concurrently, thereby connecting motor windings 32, 34 and 36 to ground in parallel. This dynamically brakes the spindle motor.

It is appreciated that, by reason of the cooperation between capacitors 60 and 70, the dynamic braking of spindle motor 10 is delayed until actuator coil 24 has been driven by the emf generated by the coasting spindle motor to retract heads 20. At the time that the spindle motor is dynamically braked, the heads are located safely at their "home" position. Hence, the possibility of head crash to or head-disc interference with the useful surface of the discs is avoided.

While the present invention has been particularly shown and described with reference to a preferred embodiment thereof, it will be recognized by those of ordinary skill in the art that various changes and modifications may be made without departing from the spirit and scope of the invention. For example, other circuitry may be used by which the voltage across capacitor 60 is supplied directly to the gate electrodes of switching elements 52, 54 and 56 to inhibit these switching elements from responding to the switching voltage across capacitor 70 until capacitor 60 has been sufficiently discharged. Other delay means may be used to delay the dynamic braking of spindle motor 10 until after heads 20 have been sufficiently retracted by use of the emf generated by the coasting spindle motor. It is intended that the appended claims be interpreted as including all such changes, modifications and substitutions.

What is claimed is:

1. A method of retracting the head assembly of a disc drive device and of braking the spindle motor therein upon interruption of power to the device, said method comprising the steps of generating an emf as a result of the rotation of said spindle motor following power interruption; using said emf to drive said head assembly in a retraction direction; dynamically braking said spindle motor following said power interruption; and delaying the dynamic braking of said spindle motor to allow said head assembly time to retract before said spindle motor is braked.

2. The method of claim 1 wherein the dynamic braking of said spindle motor is delayed for a predetermined time period following said power interruption.

3. The method of claim 2 wherein said delay is produced by charging a capacitor during normal operation of said disc drive device and discharging said capacitor in response to said power interruption; and wherein said predetermined time period is established by the time for discharging said capacitor.

4. The method of claim 3 wherein said head assembly includes an actuator coil; and wherein said step of using said emf to drive said head assembly comprises switching said emf to said actuator coil in response to said power interruption.

5. The method of claim 4 wherein said spindle motor includes plural stator windings having a common connection, each stator winding being selectively switched to a source of energizing power during normal operation of said disc drive device and all of said stator windings being connected in parallel when said capacitor is discharged.

6. In a disc drive device having a spindle motor including plural motor windings, said spindle motor rotatably driving at least one disc, a head assembly including at least one head cooperating with said disc, said head assembly having an actuator for positioning said head along said disc, a drive circuit for driving said motor windings, and a power supply for providing operating power to said drive circuit, apparatus for retracting said head and for braking said spindle motor in the event said power supply is interrupted, said apparatus comprising:

first switch means responsive to an interruption in said power supply for connecting said actuator to said motor windings to energize said actuator with an emf generated by rotation of said spindle motor;
second switch means operable to short circuit said motor windings causing the dynamic braking of said spindle motor; and
delay means for delaying the operation of said second switch means following said interruption in said power supply to allow said actuator time to retract said head before said spindle motor is braked.

7. The apparatus of claim 6 wherein said delay means comprises capacitance means coupled to said power supply and charged to a first voltage during normal operation of said disc drive device, said capacitance means being discharged in response to said interruption in said power supply; and means responsive to the voltage at said capacitance means for inhibiting said second switch means from operating to short circuit said motor windings until said capacitance means discharges.

8. The apparatus of claim 7 wherein said means for inhibiting said second switch means includes said drive circuit having outputs coupled to said second switch means for supplying inhibit signals thereto in response to said interruption in said power supply and until said capacitance means discharges.

9. The apparatus of claim 8 wherein said second switch means includes second capacitance means charged to a switching voltage during normal operation of said disc drive device; and plural switching elements connected to respective ones of said motor windings and normally operated by said drive circuit to energize individual ones of said motor windings, said plural switching elements being additionally coupled to said second capacitance means for responding to said switching voltage when said inhibit signals terminate to short circuit said motor windings.

10. The apparatus of claim 9 further comprising voltage supply means for supplying operating voltage to said drive circuit, said voltage supply means being coupled to said first capacitance means and responsive to the voltage at said first capacitance means for supplying said operating voltage to said drive circuit, and said drive circuit being operable in response to the operating voltage supplied thereto after the interruption in said power supply to produce said inhibit signals.

11. The apparatus of claim 10 wherein each of said switching elements includes a control input responsive to a trigger signal supplied thereto for energizing the respective motor winding connected thereto, said drive circuit being operable to supply trigger signals to said control inputs in a predetermined sequence during normal operation of said disc drive device and to supply inhibit signals to all of said control inputs after the interruption in said power supply; and said second capacitance means being coupled to all of said control inputs for supplying said switching voltage thereto after said first capacitance means discharges.

12. The apparatus of claim 11 further comprising high impedance means for connecting said second capacitance means to said control inputs of said switching elements.

13. The apparatus of claim 12 wherein said drive circuit includes plural amplifiers, each having a low impedance output coupled to a respective control input of said switching elements for supplying thereto said trigger signals during normal operation of said disc drive device and said inhibit signals after said interruption in said power supply.

14. The apparatus of claim 13 wherein said trigger signals exhibit a relatively high amplitude level, said switching voltage exhibits a relatively high amplitude level, and said inhibit signals exhibit a relatively low amplitude level.

15. The apparatus of claim 9 wherein said first switch means is coupled to said second capacitance means; and further comprising switch disable means energized by said power supply and coupled to said first switch means for preventing said first switch means from responding to the switching voltage to which said second capacitance means is charged during normal operation of said disc drive device, said switch disable means being inoperative after the interruption in said power supply.

16. In a disc drive device having a spindle motor including plural motor windings, a drive circuit for driving said motor windings wherein said spindle motor rotates at least one disc, a head assembly having at least one head cooperating with said disc and including an actuator for radially positioning said head along said disc, and a power supply for providing operating energy to said drive circuit during normal operation of said disc drive device, apparatus for retracting said head and for dynamically braking said spindle motor in the event said power supply is interrupted, said apparatus comprising:
- a first capacitor charged during normal operation of said disc drive device and discharged at a predetermined discharge rate after an interruption in said power supply, said first capacitor being coupled to said drive circuit for supplying operating energy thereto after said interruption in said power supply;
- plural switching elements, each energized by said drive circuit in predetermined sequence during normal operation of said disc drive device and each inhibited by said drive circuit after said interruption in said power supply and until said first capacitor is discharged below a threshold level, each switching element being coupled to a respective motor winding for enabling a drive current to flow therethrough when said switching element is energized;
- a second capacitor charged to a voltage during normal operation of said disc drive device;
- impedance means for coupling said second capacitor to all of said switching elements to supply the voltage at said second capacitor thereto after said first capacitor has discharged below said threshold level, whereby said switching elements are energized to dynamically brake said spindle motor;
- switch means having control input means coupled to said second capacitor and operable after said interruption in said power supply to connect said motor windings to said actuator for supplying an emf generated by said motor to drive said actuator so as to retract said head; and
- means for coupling said second capacitor to said switch means to supply the voltage at said second capacitor thereto.

* * * * *